(12) United States Patent  
Harmer (10) Patent No.: US 8,838,948 B2  
(45) Date of Patent: *Sep. 16, 2014

(54) REMOTE MANAGEMENT OF UEFI BIOS SETTINGS AND CONFIGURATION

(71) Applicant: Dell Products L.P., Round Rock, TX (US)

(72) Inventor: Tracy D. Harmer, Taylor, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/799,069

(22) Filed: Mar. 13, 2013

(65) Prior Publication Data

US 2013/0198505 A1     Aug. 1, 2013

Related U.S. Application Data

(63) Continuation of application No. 13/035,047, filed on Feb. 25, 2011, now Pat. No. 8,423,756, which is a continuation of application No. 12/032,732, filed on Feb. 18, 2008, now Pat. No. 7,904,708.

(51) Int. Cl.  
*G06F 15/177* (2006.01)

(52) U.S. Cl.  
USPC ............... 713/1; 713/2; 713/100; 709/221

(58) Field of Classification Search  
USPC ................... 713/1, 2, 100; 709/221  
See application file for complete search history.

(56) References Cited

U.S. PATENT DOCUMENTS

| | | |
|---|---|---|
| 5,978,912 A | 11/1999 | Rakavy et al. |
| 6,167,511 A | 12/2000 | Lewis |
| 6,324,644 B1 | 11/2001 | Rakay et al. |
| 6,594,757 B1 | 7/2003 | Martinez |
| 6,609,151 B1 | 8/2003 | Khanna et al. |
| 6,732,159 B1 | 5/2004 | Levine et al. |
| 6,732,267 B1 | 5/2004 | Wu et al. |
| 6,882,967 B2 | 4/2005 | Levine et al. |
| 6,918,062 B2 | 7/2005 | Wang et al. |
| 7,013,385 B2 | 3/2006 | Abbondanzio et al. |
| 7,904,708 B2 * | 3/2011 | Harmer ............... 713/2 |
| 8,423,756 B2 * | 4/2013 | Harmer ............... 713/2 |
| 2004/0205329 A1 | 10/2004 | Wu et al. |
| 2007/0220244 A1 | 9/2007 | Mahmoud et al. |
| 2008/0301422 A1 | 12/2008 | Johnson et al. |
| 2009/0132799 A1 | 5/2009 | Brumley et al. |
| 2009/0158021 A1 | 6/2009 | Joshi et al. |
| 2009/0177877 A1 | 7/2009 | Holdaway et al. |
| 2010/0223454 A1 | 9/2010 | Bolay et al. |

* cited by examiner

*Primary Examiner* — M Elamin  
(74) *Attorney, Agent, or Firm* — Haynes and Boone, LLP (57) ABSTRACT

In an information handling system (IHS), remote management of basic input/output system (BIOS) settings and configuration includes maintaining a BIOS setting/configuration database, providing an application to communicate a BIOS setting/configuration from the database to a BIOS system, determining whether the BIOS setting/configuration communicated from the database to the BIOS system is a special BIOS configuration capsule packet, and validating BIOS setting/configuration.

20 Claims, 6 Drawing Sheets

REMOTE MANAGEMENT OF UEFI BIOS SETTINGS AND CONFIGURATION

BACKGROUND

The present application is a Continuation of U.S. patent application Ser. No. 13/035,047, filed on Feb. 25, 2011, now U.S. Pat. No. 8,423,756, which is a Continuation of U.S. patent application Ser. No. 12/032,732, filed on Feb. 18, 2008, now U.S. Pat. No. 7,904,708, granted Mar. 8, 2011, the disclosures of which are incorporated herein by reference.

The present disclosure relates generally to information handling systems, and more particularly to a remote management of Universal Extensible Firmware Interface (UEFI) basic input/output (BIOS) settings and configuration.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

For purposes of this disclosure, Extensible Firmware Interface (EFI) and Universal Extensible Firmware Interface (UEFI) are used interchangeably and called UEFI for simplicity. Today in Legacy BIOS as well as UEFI BIOS systems there is usually a setup option that allows a user of the IHS to change system configurations and/or BIOS settings. The types of things that can be changed include, but are not limited to, hard drive setup, USB controller setup, passwords, TPM settings, video settings, and/or a variety of other configurations and/or settings.

Typically when the IHS is turned on, a message is displayed that allows the user to press a specific keyboard input key to enter a BIOS setup. When this key is pressed within a set time period, the BIOS code will display a setup screen that can be used to change these settings. Entering setup may optionally be protected to change these settings. Once in Setup the user or authorized person can then change the settings and configure the system, associated peripherals, and etc.

This means that a person has to physically be present at the computer in order to change any of these settings. For Information Technology (IT) managed organizations where the computer systems are managed by an IT group, the requirement of having to physically be present at each physical computer to make BIOS configuration changes can represent a large labor effort. If an organization decides to implement a policy on specific computer BIOS settings, then it would require having an IT person physically go to each individual IHS to make those changes. As BIOS code and specifically as UEFI/EFI BIOS become more available, the technologies present in the BIOS code continue to get more complex and more functionality is being added to this environment. This will mean an increase in the number and types of BIOS Settings and Configuration that can and will be necessary in the future.

Accordingly, it would be desirable to provide an improved remote management of UEFI BIOS settings and configuration system absent the deficiencies described above.

SUMMARY

According to one embodiment, a remote management of basic input/output system (BIOS) settings and configuration is provided by maintaining a BIOS setting/configuration database, providing an application to communicate a BIOS setting/configuration from the database to a BIOS system, determining whether the BIOS setting/configuration communicated from the database to the BIOS system is a special BIOS configuration capsule packet, and validating BIOS setting/configuration.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, cell phone, PDA, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include none, one, or more disk drives, none, one, or more network ports for communicating with external devices as well as various input and output (I/O) devices, such as a keyboard, a mouse, and have any type of video display as well as devices that have touch screens. The IHS 100 may also include one or more buses operable to transmit communications between the various hardware components.

Figure 1:
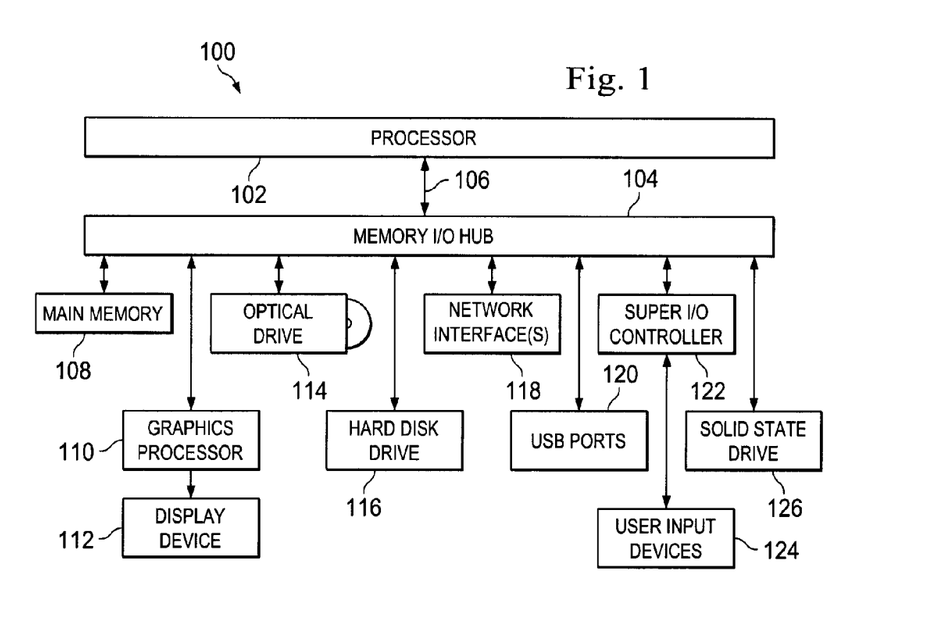
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, none, one or more hard disk drives 116, none, one or more network interfaces 118, none, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
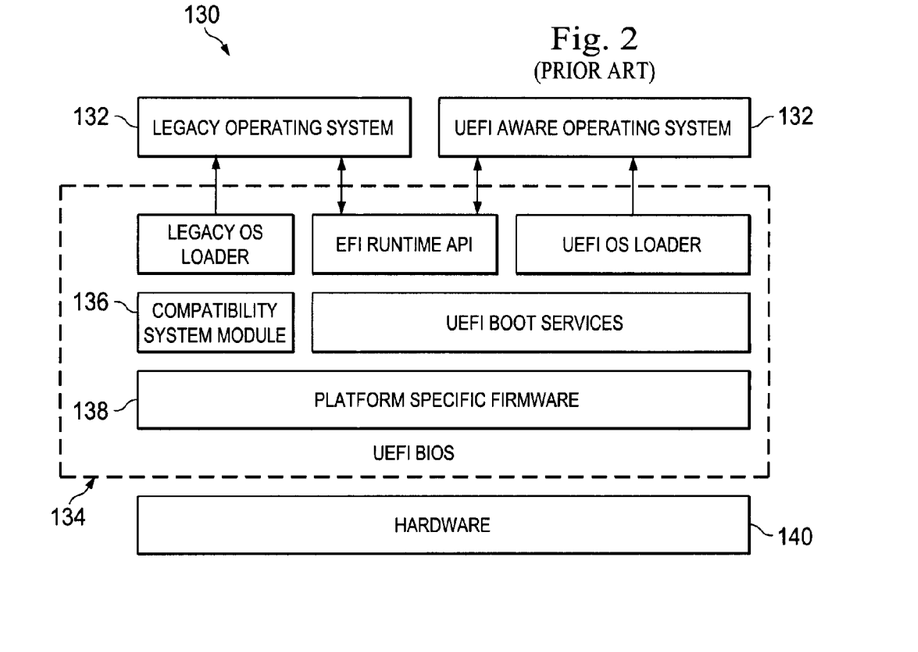
FIG. 2 illustrates a prior art embodiment of a UEFI BIOS.

FIG. 2 illustrates a prior art embodiment of a UEFI BIOS 134 for a UEFI system 130. In this system 130, commonly understood in the art, an operating system 132 communicates with a UEFI BIOS 134. Within the UEFI BIOS architecture there is Platform Specific Firmware 138 and optionally a compatibility system module 136 which communicate with the hardware 140, such as the drives 114, 116 and 126 and/or the user input devices 124. The compatibility system module 136 is used to provide legacy BIOS functionality, like interrupts and to be able to boot a legacy operating system. The UEFI interface provides a new interface that is used to boot UEFI aware operating systems. UEFI is a complete framework that provides for the functionality of the PEI and DXE phases and their related drivers.

FIGS. 3-7 illustrate different embodiments of remote management systems for UEFI BIOS settings and configuration. This disclosure provides several systems and methods for performing and managing UEFI BIOS setup settings and configuration data via remote IHSs 100. This idea may allow limiting access to BIOS setup by using a system and/or administrator passwords such that users would not have access to their IHS's 100 BIOS Setup. This would then provide a method for an information technology (IT) group to maintain a database 144 of BIOS settings and configuration Data. This database 144 may maintain settings and configuration data that is global to the company or environment. It could also maintain settings that are specific to an individual IHS 100 or group of IHSs 100. The database 144 may also maintain settings that are specific to certain users globally or specific users using specific IHSs 100.

In an embodiment, a organization IT Group may manage and own the BIOS settings and configuration database 144, no matter what type of database configuration or combinations of configurations are used. Access to retrieve information from the database 144 may be available over a network 146. In an embodiment, the database 144 may be managed by an IT group and a software application may be provided to edit, create and modify the BIOS setting and configuration data maintained in the database 144. With the database 144 available and the data configured in the database 144, it may be available for managing the BIOS settings and configuration of each individual IHS 100.

Disclosed are four different software methods (e.g., using operating system (OS) applications 147, 148, 149, and 150, OS kernel mode drivers 152 and UEFI BIOS changes 154) that may be used to validate that the IHS 100 has the proper BIOS Settings and Configuration. However, one of ordinary skill in the art should readily understand that other methods may be practiced within the scope of those disclosed. A IOCTL I/F 151 couples an application 147, 148, 149, 150 with a kernel mode driver 152 for an application to be able to communicate with the device driver 152. In other words, the phrase kernel mode device driver is used for simplicity throughout this disclosure. However, it is to be understood that any operating system 132, system level device driver that would have access to the UEFI system runtime table pointers and that also has the right to execution privileges in the operating system 132 to make UEFI runtime system calls would work as well. Another method may be to use an operating system provided interface to call UEFI runtime services from an operating system application without having to develop a separate operating system specific device driver to provide that interface.

Figure 3:
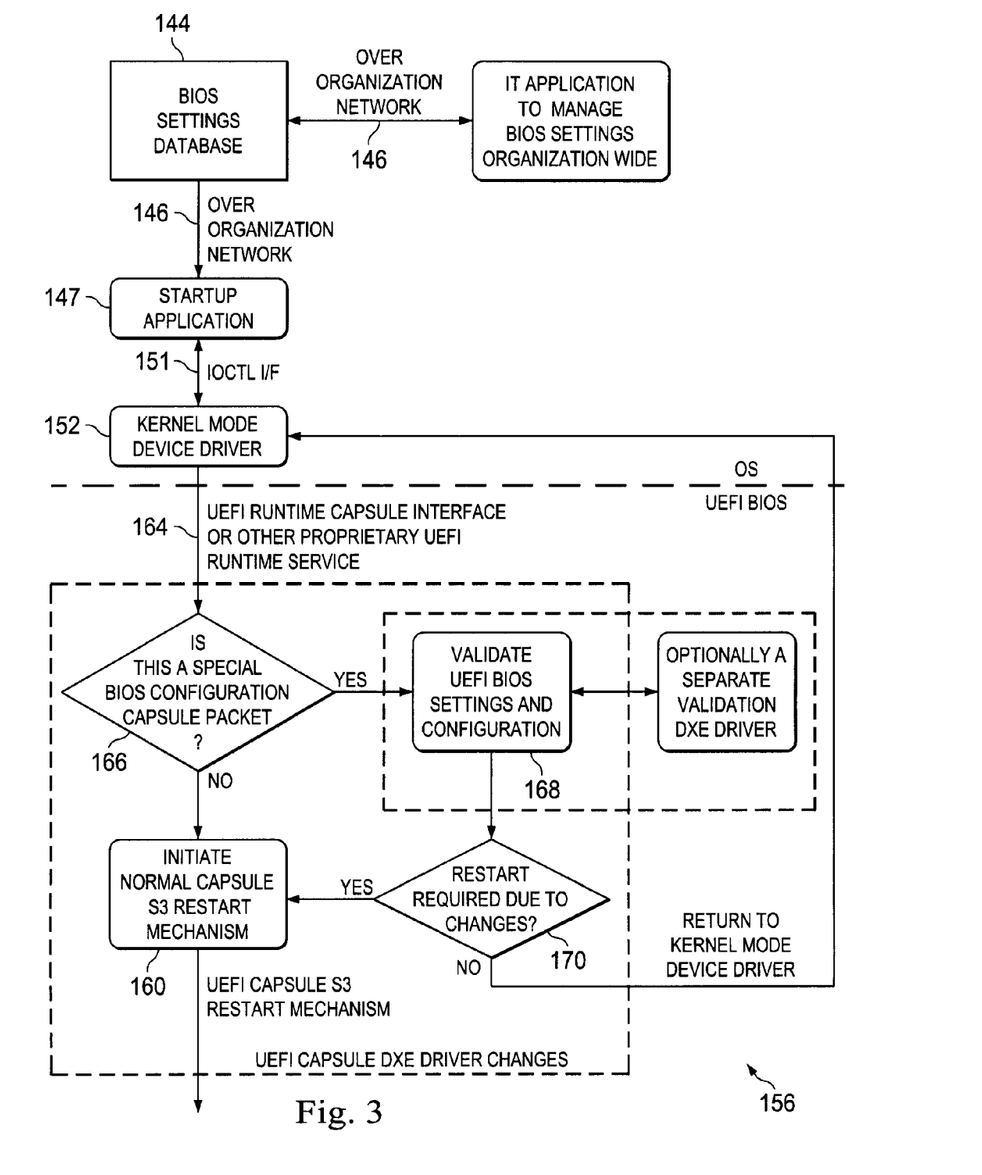
FIG. 3 illustrates an embodiment of a remote management system of UEFI BIOS settings and configuration.
Figure 4:
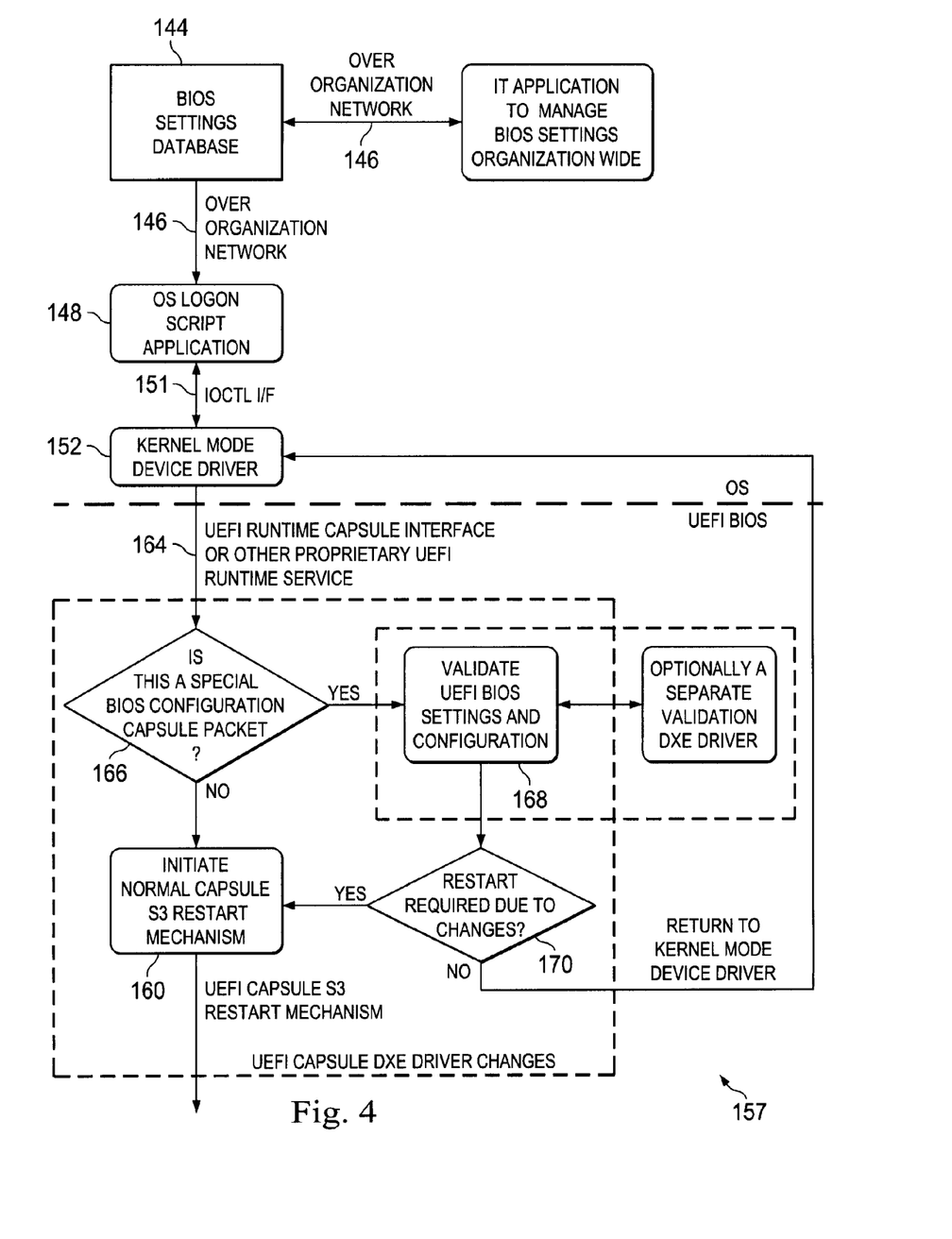
FIG. 4 illustrates an embodiment of a remote management system of UEFI BIOS settings and configuration.
Figure 5:
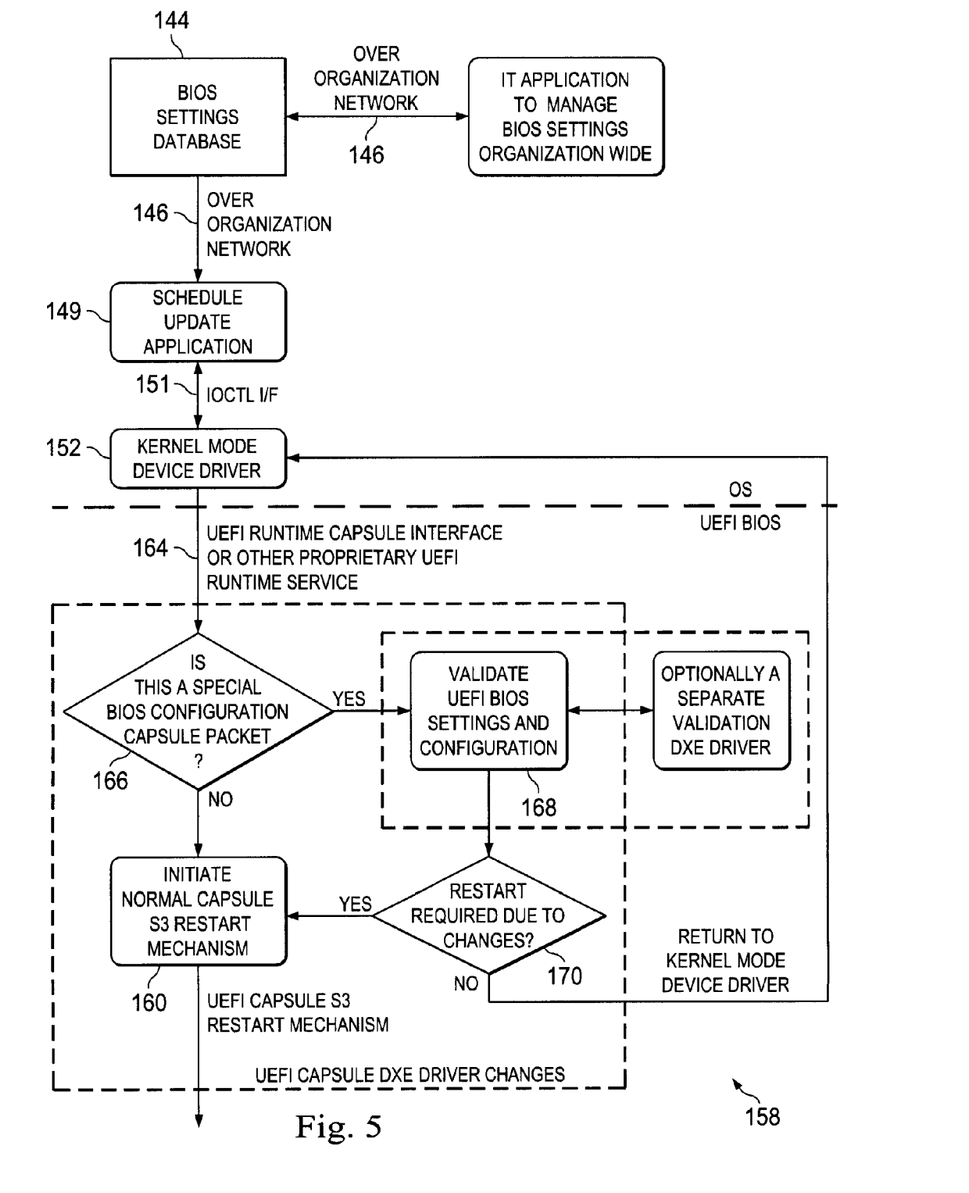
FIG. 5 illustrates an embodiment of a remote management system of UEFI BIOS settings and configuration.

FIGS. 3-5 illustrate block diagrams of methods 156, 157, and 158, such as, software methods, to take advantage of UEFI runtime services 164. Specifically, the UEFI/EFI capsule runtime service 164. The capsule runtime service 164 is a UEFI defined runtime service. This service is defined to provide a method to send data (e.g., can be a combination of data and code) from the OS to the UEFI BIOS. It is currently defined in the UEFI Specification as a one way interface that causes a system reset with a special case S3 shutdown. This was originally conceived to allow for BIOS firmware updates to be received, and then passed from the OS to the UEFI BIOS. When the DXE capsule runtime service is invoked it is responsible for saving the capsule data and then initiating a special S3 restart 160. The S3 restart code then checks to see if this is in memory 108 and if necessary updates the memory 108 with the new BIOS image.

The capsule runtime service 164 may be called by an OS kernel mode device driver 152. The methods 156, 157, and 158 propose different combinations of an application software program 147, 148, and/or 149 that communicates with a special operating system specific kernel mode device driver 152 and an extension to the idea of the UEFI capsules interface in such a way that capsule runtime service may be used for an additional purpose.

A difference between the method 157 and the method 158 is when they occur and how the application software program 147, 148 would work. The first method 156 uses a special application 147 that communicated with the special OS kernel mode device driver 152 very early during the OS boot process, (e.g., prior to allowing anyone to log on to the system). The second method 157 waits until a user is logging on to the IHS 100 with their password. This would use a special logon validation application 148 that communicates with the special OS kernel mode device driver 152. This second method 157 has an added benefit of being able to not only know what IHS 100 is being booted, but also what user is logging on to the IHS 100.

In either case, what happens next is substantially same. The special application 147, 148 goes out and checks the BIOS setting and configuration database 144 for the current IHS 100, user, group or company wide settings that would apply to the current boot. This data would then be combined into a special capsule data packet that contains currently authorized BIOS settings and configuration data based on what IHS 100 is booting and potentially what user is logging in (for method 2, 157). The special application program 148, gathers this data and creates a special and identifiable capsule data packet that then passes to the special OS kernel mode device driver 152 through an IOCTL interface. This kernel mode device driver 152 then makes an appropriate capsule runtime services call passing the capsule data packet.

The methods 156, 157 then invoke the UEFI/EFI capsule runtime service DXE driver. In an embodiment, methods 156 and 157 allow that the capsule runtime service DXE driver be modified in such a way that it can recognize the special Capsule Data packet that is sent by the OS kernel mode device driver 152 as a special BIOS Setting and Configuration data packet. When the UEFI/EFI Capsule DXE driver determines at 166 that the data packet is a BIOS Setting and Configuration data packet, it then performs different functionality from what is normally done when a Capsule data packet is received.

For methods 156, 157, the UEFI/EFI Capsule DXE driver is then responsible for validating at 168 the BIOS Settings and Configuration data contained in the data packet with the settings that are currently being used by the UEFI/EFI BIOS. The validation could be done by the Capsule DXE driver or it could optionally call another special DXE Driver that may be created specifically for validating the BIOS Settings and Configuration. There may be other places that the validation could be done. It should be noted that the BIOS settings and configuration data contained in the capsule data packet is validated against what is currently being used by the UEFI/EFI BIOS.

If the Capsule data matches what is currently configured in BIOS then there is no need to do any changes. In this case the UEFI Capsule DXE driver may do a normal return back to the kernel mode driver 152 that called it which would then continue to allow the boot of the OS (method 156) or allow the user to finish logging on to the IHS 100 (method 157).

If there are differences found or changes that need to be made to the BIOS Settings, then the changes may be made just as if BIOS setup had made the changes and then the special cased S3 resume mechanism 160 or other restart mechanisms could be used to reboot the system, when necessary, as determined in 170, and allow the new BIOS changes to be applied and let the UEFI BIOS boot again to the OS. This time the same process will take place, essentially validating the changes against the database, only this time everything matches and allows the OS to boot or the user to log on to the IHS 100.

Figure 6:
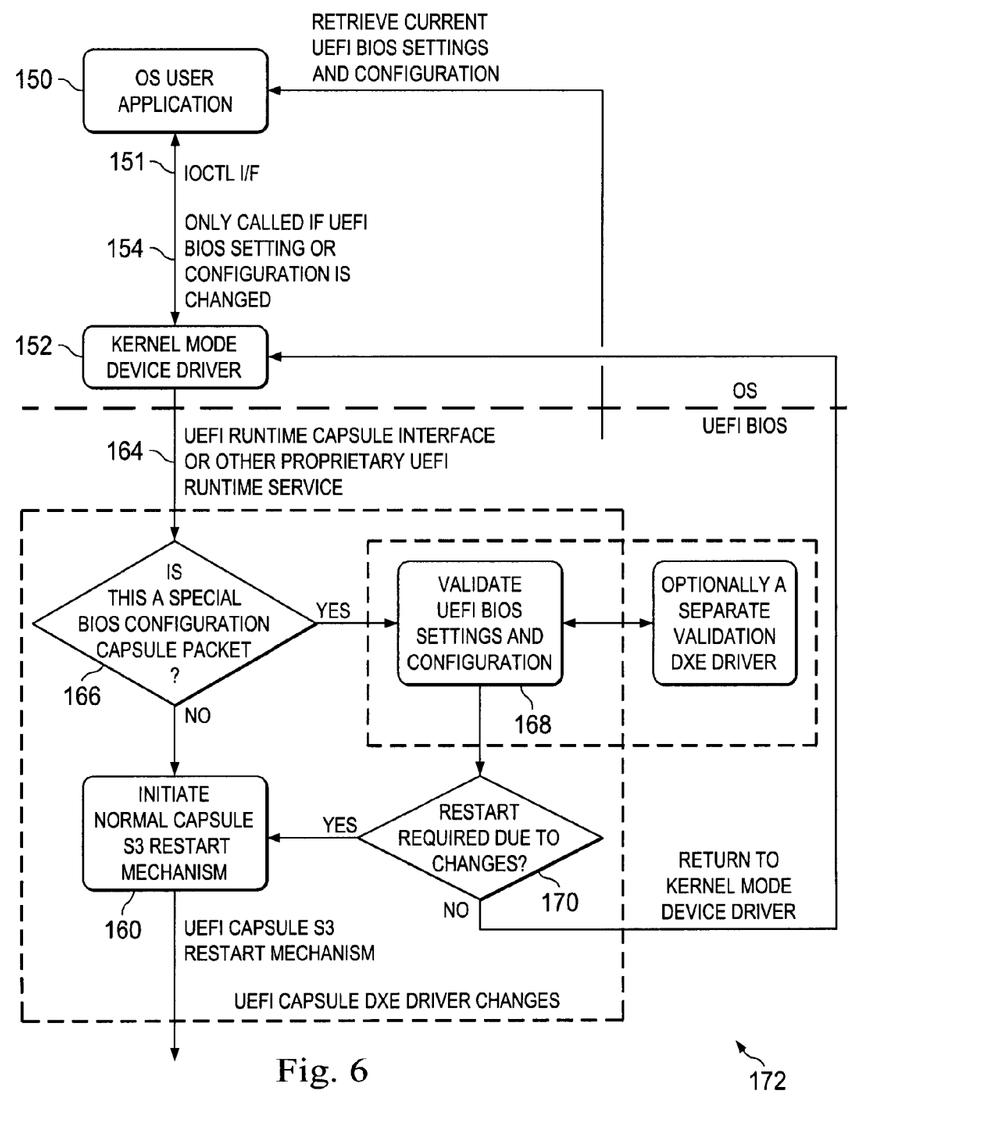
FIG. 6 illustrates an embodiment of a remote management system of UEFI BIOS settings and configuration.

The validation of BIOS Settings and Configuration data at 168 may allow for the following:

1. IT Database 144 of IHS 100 & user specific BIOS Settings & Configurations that are allowed.
2. Remote management of BIOS settings on organization wide IHSs 100. When a user needed a change to be made, it could be done remotely by an IT support person, without having to go physically to the IHS 100. This change may be made in the Database 144 and then the IT support person may then tell the user to reboot their system. During the reboot the process above would take place with a change being detected, causing a restart and the changes being applied and then a normal boot.
3. This may also allow for an OS end-user application running on the IHS 100 to be used to manage BIOS settings on the local IHS 100 (e.g., method 172).

Methods 156 and 157 have an advantage of using an OS level application 147, 148 and kernel mode driver 152 to perform the database, network and user interface work. This allows for all of the resources and memory 108 of the operating system to perform a portion of this work. In an embodiment, the UEFI BIOS changes only need to consider comparing and then, if needed, changing individual UEFI BIOS settings. This allows for the low level code changes that are needed in the UEFI/EFI BIOS to be minimized.

As an option, instead of using the UEFI/EFI capsule runtime service as a means for sending the database 144 information to the UEFI/EFI BIOS, a proprietary or new UEFI/EFI runtime service may be defined and implemented so that the special OS kernel mode device driver 152 may call. While this is technically possible, runtime services are supposed to be agreed to and defined in the industry standard UEFI/EFI Specification. Therefore, creating a new runtime service would be outside of the current UEFI/EFI Specification. However, this disclosure should not be limited by what runtime service is used to pass the data from the OS side to the UEFI/EFI BIOS.

Method 158 is where there is a scheduled application 149 that runs whenever the IT department needs it to. This could be on a regularly scheduled basis or only as needed. This embodiment provides a method 158 for pushing out changes either globally or to a specific group of IHSs 100 that are being managed by the IT department. This allows for pushing out changes as needed and forcing a reboot of each IHS 100 once the updated BIOS settings and configuration had been applied. This is similar to IT departments pushing out software or security updates and forcing all IHSs 100 to apply those updates organization wide. This would provide for a similar functionality for the BIOS Settings and Configuration Data.

This method 158 may be comprised of a special application program that may be scheduled to run when needed. This application program would then get the appropriate BIOS settings and configuration data from the database 144. The application program 149 may then call the special kernel mode driver 152 through an IOCTL interface 151. The kernel mode driver 152 may then create a capsule data packet and call the UEFI/EFI capsule runtime service 164. The changes may be then applied as described above for the methods 156 and 157 described above and if a BIOS setting or configuration had been changed, it could then force the restart of the IHS 100.

Method 172 shows a way that an end user application 150 may be provided to allow a user to manage and change BIOS settings and configuration using the same UEFI runtime service 164 substantially similar to that being used in Methods 156, 157, and 158. The difference here is that there is no database involved and this is just a convenient way to allow the user to change their UEFI BIOS settings and configuration while running in the environment of the operating system that they are running. It is also conceivable that the UEFI/EFI BIOS settings and configuration changes could be applied in such a way that a system reboot would not be necessary for method 172 as well as methods 156, 157, and 158.

Figure 7:
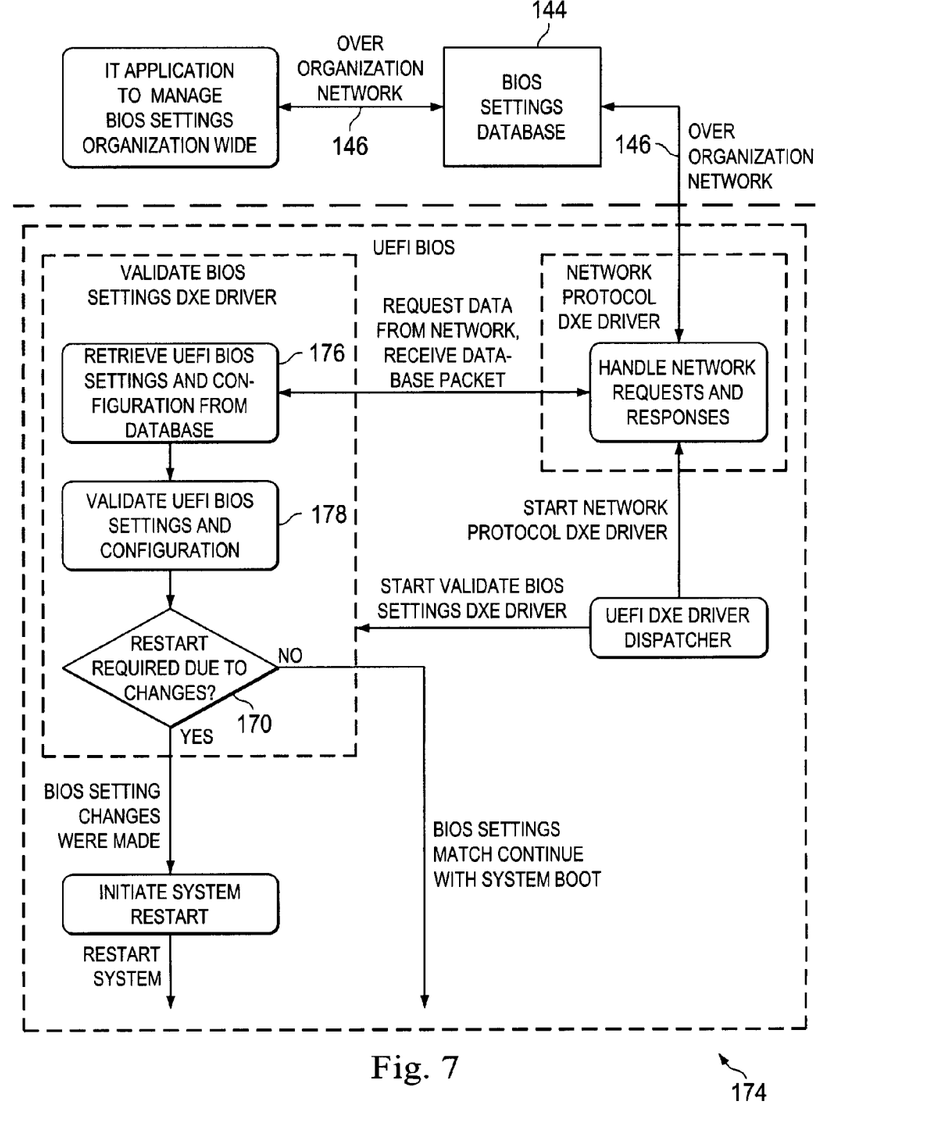
FIG. 7 illustrates an embodiment of a remote management system of UEFI BIOS settings and configuration.

The method 174, does not use the UEFI/EFI capsule runtime service 164 or any other UEFI runtime service. Instead, this method 174 operates during the UEFI/EFI BIOS POST processing, prior to booting any operating system. This has an advantage of not requiring operating system specific applications or drivers. The work to query the database 144, receive data 176 from the database 144 and validate the current BIOS Settings and Configuration 178 may be done within the UEFI/EFI BIOS code. This may be done during the DXE phase of the UEFI/EFI BIOS. This is when memory 108 and other system resources are available. This may also be done during the PEI phase of the UEFI/EFI BIOS, but with more development difficulty.

This may involve writing special DXE driver or drivers that provide the functionality necessary in order to retrieve information from an organization BIOS Settings and Configuration database 144. This may require networking support along with a specific protocol for talking to the external network database. This would require additional development within the UEFI/EFI BIOS and it would slow down the perceived BIOS boot time. However, this option itself may be a BIOS Setup configuration option and only when initiated, would it may take extra time.

The similar steps described above for methods 156 and 157 may still be utilized. A difference is that the UEFI/EFI BIOS is responsible for doing the database query, receiving the data, validating the configuration information with what the UEFI/EFI BIOS is currently using and make updates to these settings as necessary. If changes are not needed, then the power on self-test (POST) could continue and boot an operating system.

If changes were made in the BIOS, the UEFI/EFI BIOS could reboot the system as needed, depending on the changes being applied, so that the new changes would be used. This will force another check of the BIOS Settings and Configuration Data, which should just validate and allow the system to boot the operating system.

In an embodiment, there is also a way to implement substantially the same type of scenario on a legacy BIOS using the SMI interface. This may involve a different process and the method of doing the code would be different.

An advantage of the UEFI BIOS is that it provides for a normal published interface to be used in methods 156, 157, and 158. Another advantage of methods 156, 157, & 158 is that it may not affect the BIOS boot times. For method 174, UEFI provides an extensible driver based environment that would support loading additional DXE drivers that may be needed to practice method 174. However, doing this during BIOS and waiting on network requests and data, would add to the overall boot time.

This disclosure may extend the control and security of individual IHSs 100 to the BIOS level settings. As an example, one could use these methods to control the settings remotely for what the mass storage boot order is. If the UEFI BIOS has both a system and administrator password that only IT knew, then a user would not be able to change the boot order themselves. However, if a particular user needed the boot order changed so they could boot off of a different mass storage device, it could be controlled remotely on an individual user basis. Additionally, there are other BIOS settings that could also be managed this way.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for updating basic input/output system (BIOS) settings and configuration on an Information Handling System (IHS), comprising:
   providing an IHS including at least one processor and at least one non-transitory memory that stores instructions that, when executed by the at least one processor, cause the at least one processor to provide a BIOS and an operating system (OS) including an OS application;
   receiving BIOS setting/configuration change data for the BIOS by the OS application and providing the BIOS setting/configuration change data in a special BIOS configuration capsule packet;
   communicating the special BIOS configuration capsule packet by the OS application to an OS device driver while running in an environment of the OS;
   passing the special BIOS configuration capsule packet from the OS device driver to a capsule runtime service driver as a special capsule data packet;
   determining, by the capsule runtime service driver, that the special capsule data packet is a special BIOS configuration capsule packet; and
   validating the BIOS setting/configuration change data for the BIOS in the special BIOS configuration capsule packet against currently used BIOS setting/configuration data being used by the BIOS.

2. The method of claim 1, wherein the BIOS is a unified extensible firmware interface (UEFI) BIOS, a legacy BIOS, or an extensible firmware interface (EFI) BIOS.

3. The method of claim 1, further comprising:
   updating the currently used BIOS setting configuration data being used by the BIOS with the BIOS setting/configuration change data.

4. The method of claim 3, further comprising:
   initiating a restart mechanism subsequent to the updating.

5. The method of claim 4, wherein the restart mechanism is a special S3 resume mechanism.

6. The method of claim 3, wherein the currently used BIOS setting configuration data being used by the BIOS is updated with the BIOS setting/configuration change data without initiating a restart mechanism.

7. A method for updating basic input/output system (BIOS) settings and configuration on an Information Handling System (IHS), comprising:
   providing an IHS including at least one processor and at least one non-transitory memory that stores instructions that, when executed by the at least one processor, cause the at least processor to provide a BIOS and an operating system (OS) including an OS application and an OS device driver;
   receiving BIOS setting/configuration change data for the BIOS by the OS application and providing the BIOS setting/configuration change data in a special BIOS configuration capsule packet;
   communicating the special BIOS configuration capsule packet by the OS application to the OS device driver while running in an environment of the OS;
   passing the special BIOS configuration capsule packet from the OS device driver to a capsule runtime service driver as a special capsule data packet;
   determining, by the capsule runtime service driver, that the special capsule data packet is a special BIOS configuration capsule packet; and
   validating the BIOS setting/configuration change data for the BIOS in the special BIOS configuration capsule packet against currently used BIOS setting/configuration data being used by the BIOS.

8. The method of claim 7, wherein the BIOS is a unified extensible firmware interface (UEFI) BIOS, a legacy BIOS, or an extensible firmware interface (EFI) BIOS.

9. The method of claim 7, further comprising:
   updating the currently used BIOS setting configuration data being used by the BIOS with the BIOS setting/configuration change data.

10. The method of claim 9, further comprising:
    initiating a restart mechanism subsequent to the updating.

11. The method of claim 10, wherein the restart mechanism is a special S3 resume mechanism.

12. The method of claim 7, wherein the currently used BIOS setting configuration data used by the BIOS is updated with the BIOS setting/configuration change data without initiating a restart mechanism.

13. A method for updating basic input/output system (BIOS) settings and configuration on Information Handling Systems (IHSs), comprising:
  providing an HIS including at least one processor and at least one non-transitory memory that stores instructions that, when executed by the at least one processor, cause the at least one processor to provide a BIOS and an operating system (OS) that runs an OS user application that is coupled to a kernel mode device driver through an input/output control interface;
  receiving BIOS setting/configuration change data for the BIOS by the OS user application from a user and creating a special BIOS configuration capsule packet by the OS user application that includes the BIOS setting/configuration change data;
  communicating the special BIOS configuration capsule packet by the OS application over the input/output control interface to the kernel mode device driver while running in an environment of the OS;
  passing the special BIOS configuration capsule packet from the kernel mode device driver to a capsule runtime service driver as a special capsule data packet;
  determining, by the capsule runtime service driver, that the special capsule data packet is a special BIOS configuration capsule packet; and
  validating the BIOS setting/configuration change data for the BIOS in the special BIOS configuration capsule packet against currently used BIOS setting/configuration data being used by the BIOS.

14. The method of claim 13, wherein the BIOS is a unified extensible firmware interface (UEFI) BIOS, a legacy BIOS, or an extensible firmware interface (EFI) BIOS.

15. The method of claim 13, further comprising:
  updating the currently used BIOS setting configuration data being used by the BIOS with the BIOS setting/configuration change data.

16. The method of claim 14, further comprising:
  initiating a restart mechanism subsequent to the updating.

17. The method of claim 15, wherein the restart mechanism is a special S3 resume mechanism.

18. The method of claim 15, wherein the currently used BIOS setting configuration data used by the BIOS is updated with the BIOS setting/configuration change data without initiating a restart mechanism.

19. The method of claim 18, wherein the capsule runtime service driver is a UEFI capsule driver execution environment (DXE) device driver.

20. The method of claim 19, wherein the validating is performed by a special DXE driver that is separate from the UEFI capsule DXE device driver.

* * * * *